United States Patent
Larsson et al.

(10) Patent No.: US 8,179,449 B2
(45) Date of Patent: May 15, 2012

(54) PORTABLE ELECTRONIC APPARATUS INCLUDING A DISPLAY AND METHOD FOR CONTROLLING DISPLAY CONTENT BASED ON MOVEMENT OF THE DISPLAY AND USER POSITION

(75) Inventors: Bo Larsson, Malmo (SE); Markus Andreasson, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 330 days.

(21) Appl. No.: 12/469,199

(22) Filed: May 20, 2009

(65) Prior Publication Data

US 2010/0295958 A1    Nov. 25, 2010

(51) Int. Cl.
*H04N 5/235* (2006.01)
*H04N 5/228* (2006.01)
*H04N 5/222* (2006.01)

(52) U.S. Cl. ............... 348/222.1; 348/333.11
(58) Field of Classification Search .......... 348/77, 348/78, 135, 142, 143, 161, 169, 207.99, 348/222.1, 333.11; 345/419, 6
See application file for complete search history.

(56) References Cited

U.S. PATENT DOCUMENTS

| | | | | |
|---|---|---|---|---|
| 5,574,836 | A * | 11/1996 | Broemmelsiek | 345/427 |
| 7,239,293 | B2 * | 7/2007 | Perlin et al. | 345/7 |
| 7,616,187 | B2 * | 11/2009 | Koo et al. | 345/156 |
| 7,705,876 | B2 * | 4/2010 | Starkweather et al. | 348/51 |
| 7,903,109 | B2 * | 3/2011 | Rurin | 345/419 |
| 2001/0026249 | A1 * | 10/2001 | Bell et al. | 345/9 |
| 2002/0015007 | A1 * | 2/2002 | Perlin et al. | 345/6 |
| 2002/0021278 | A1 | 2/2002 | Hinckley et al. | |
| 2003/0080937 | A1 | 5/2003 | Light | |
| 2009/0313584 | A1 | 12/2009 | Kerr et al. | |
| 2010/0123716 | A1 * | 5/2010 | Li et al. | 345/420 |

FOREIGN PATENT DOCUMENTS

| | | |
|---|---|---|
| EP | 0 874 303 | 10/1998 |
| EP | 1 355 223 A2 | 10/2003 |
| EP | 1 667 471 A1 | 6/2006 |
| WO | 2006/000368 A1 | 1/2006 |

OTHER PUBLICATIONS

K.C. Yow and R. Cipolla, "*Enhancing Human Face Detection Using Motion and Active Contours*," Proc. Third Asian Conf. Computer Vision, pp. 515-522, 1998.

A. Rajagopalan, K. Kumar, J. Karlekar, R. Manivasakan, M. Patil, U. Desai, P. Poonacha, and S. Chaudhuri, "*Finding Faces in Photographs*," Proc. Sixth IEEE Int'l Conf. Computer Vision, pp. 640-645, 1998.

(Continued)

*Primary Examiner* — Nicholas Giles
(74) *Attorney, Agent, or Firm* — Renner, Otto, Boisselle & Sklar LLP

(57) ABSTRACT

A portable electronic apparatus includes a display, a user position estimating unit and a display movement estimating unit. The user position estimating unit is for estimating the user position with respect to the display. The display movement estimating unit is for estimating the display movement. The apparatus is configured for estimating the user position, here referred to as initial user position, at least at a first moment; and, during at least an interval of time after the first moment, estimating the display movement, and controlling the display content based on the initial user position and the display movement. The invention also relates a method for controlling such an apparatus and to a computer program therefor.

16 Claims, 5 Drawing Sheets

OTHER PUBLICATIONS

E. Osuna, R. Freund, and F. Girosi, "Training Support Vector Machines: *An Application to Face Detection*," Pro. IEEE Conf. Computer Vision and Pattern Recognition, pp. 130-136, 1997.

M. Turk and A. Pentland, "*Eigenfaces for Recognition*," J. Cognitive Neuroscience, vol. 3, No. 1, pp. 71-86, 1991.

P. Viola, M. J. Jones, "*Robust Real-Time Face Detection*," International Journal of Computer Vision, vol. 57, No. 2, May 2004, pp. 137-154.

K. Etemad, R. Chellappa, "*Discriminant Analysis for Recognition of Human Face Images*," Journal of the Optical Society of America A, vol. 14, No. 8, Aug. 1997, pp. 1724-1733.

Accelerometer (May 18, 2009), in *Wikipedia, The Free Encyclopedia*, Retrieved 13:32, May 18, 2009, from http://en.wikipedia.org/w/index.php?title=Accelerometer&oldid=290674932.

Compass (May 17, 2009), In *Wikipedia, The Free Encyclopedia*, Retrieved 13:53, May 18, 2009, from http://en.wikipedia.org/w/index.php?title=Compass&oldid=290609843.

http://www.ssec.honeywell.com/magnetic/datasheets/hmr3100.pdf—retrieved on May 18, 2009.

http://www.youtube.com/watch?v=7SImOIMcMlk—Title: 3D Eyetracking UI—retrieved on May 19, 2009.

International Search Report for corresponding application No. PCT/EP2009/064607 dated Apr. 8, 2010.

Written Opinion for corresponding application No. PCT/EP2009/064607 dated Apr. 8, 2010.

Written Opinion for corresponding International Application No. PCT/EP2009/064607, dated Jul. 14, 2011.

Suya You et al., "Hybrid Inertial and Vision Tracking for Augmented Reality Registration," Mar. 1999, 8 pages, XP010329315.

Lin Chai et al., "3-D Motion and Structure Estimation Using Inertial Sensors and Computer Vision for Augmented Reality," Submitted to Presence: Teleoperators and Virtual Environments, Oct. 2002, pp. 1-39, XP002531427.

Suya You et al., "Fusion of Vision and Gyro Tracking for Robust Augmented Reality Registration," Proceedings of the Virtual Reality 2001 Conference (VR'01), Jan. 2011, 8 pages, XP 031172752.

Ronald Azuma et al., "Tracking in Unprepared Environments for Augmented Reality Systems," Computers & Graphics, Elsevier Science Ltd., Dec. 1999, pp. 787-793, XP004187823.

\* cited by examiner

PORTABLE ELECTRONIC APPARATUS INCLUDING A DISPLAY AND METHOD FOR CONTROLLING DISPLAY CONTENT BASED ON MOVEMENT OF THE DISPLAY AND USER POSITION

TECHNICAL FIELD

The present invention relates to a portable electronic apparatus including a display and a method for controlling such an apparatus. The invention also relates to a computer program comprising instructions configured, when executed on a computer, to cause the computer to carry out the above-mentioned method. The display may notably, but not only, be used to confer a three-dimensional visual effect to a user. Furthermore, the portable electronic apparatus may notably, but not only, be a mobile phone.

BACKGROUND

Portable electronic apparatuses are used for various applications, such as for providing wireless communications between a user and a base station. As more and more information need to be provided on the display of such apparatuses, it is useful to confer to a user looking at the display the impression that what is displayed has three dimensions.

European patent application EP 1 667 471 A1 relates to a portable communication device comprising a display unit for conferring an image with a three-dimensional effect to a user. A particular embodiment of EP 1 667 471 A1 relates to the use of an accelerometer for sensing movements of the portable communication device.

It is desirable to provide portable electronic apparatuses, methods for controlling such apparatuses, and computer programs to improve the efficiency of the visual effects to be conferred to users in terms of computational resource usage and battery power usage, preferably without reducing the precision of the visual effects.

SUMMARY

In order to meet, or at least partially meet, the above objectives, a portable electronic apparatus, a method and a computer program according to the invention are defined in the independent claims. Advantageous embodiments are defined in the dependent claims.

In one embodiment, the portable electronic apparatus includes a display, a user position estimating unit, and a display movement estimating unit. The user position estimating unit is configured for estimating the position, here referred to as user position, of a user with respect to the display. The display movement estimating unit is configured for estimating the movement, here referred to as display movement, of the display. The apparatus is configured for estimating, with the user position estimating unit, the user position, here referred to as initial user position, at a first moment. The apparatus is further configured for, during an interval of time after the first moment, estimating, with the display movement estimating unit, the display movement, and controlling the display content based on the display movement and the initial user position.

This enables to efficiently control the display content based on the display movement and user position with respect to the display, while aiming at consuming as less computational resources and/or battery power as possible. These advantages are notably provided when the control of the display content includes generating a three-dimensional visual effect on the display. The invention is however not limited to such a control of the display content. Other display control actions based on the initial user position and the display movement are within the scope of the invention.

Estimating the user position with respect to the display is to be here interpreted in a broad manner, as follows.

In one embodiment, estimating the user position with respect to the display means estimating the position of the user with respect to a physical frame of reference (i.e. a coordinate system or set of axes) attached to the display. If the display cannot move with respect to the apparatus, i.e. because the display is for instance integrally formed within the apparatus, the physical frame of reference attached to the apparatus and the physical frame of reference attached to the display are the same. In this embodiment, the user position may thus consist in the position in a three-dimensional Cartesian coordinate system of the user, and in particular of the user's face, with respect to the display. The user position may also be expressed in other types of three dimensional coordinate systems without departing from the invention. Other three dimensional coordinate systems include for instance cylindrical and spherical coordinate systems.

In another embodiment, estimating the user position with respect to the display means estimating the angular position of the user, and in particular of the user's face, with respect to an axis perpendicular to the display, without estimating the distance between the user and the display. In this embodiment, the user position may therefore be expressed by two angles indicating the position of the user, and in particular of the user's face, with respect to the display.

In yet another embodiment, estimating the user position with respect to the display means estimating the distance between the user and the display, without estimating the angular position of the user with respect to an axis perpendicular to the display. In this embodiment, how far the user, and in particular of the user's face, is positioned from the display is used as the user position to control the display content.

In one embodiment, estimating the user position with respect to the display means estimating the position of the user's face on an image captured by a camera of the apparatus. In other words, in this embodiment, the user position is the position of the user's face within the captured image, i.e. within a two-dimensional coordinate system associated with an image captured by an apparatus' camera.

Estimating the movement of the display means here estimating the state of motion of the display with respect to a physical frame of reference which is common to the apparatus and the user. In this common physical frame of reference, both the display and the user can move. The user either holds the apparatus including the display, or the user does not. The electronic apparatus is portable in that it can be held and carried by a user, and in particular a user's hand.

The user position estimated at a first moment, which is the initial user position, is used to calibrate the relative position and orientation of the user and the portable electronic apparatus. Then, by estimating the display movement during an interval of time after the first moment, the relative position and orientation of the apparatus and the user is updated during said interval of time. This works generally well because the position and orientation of the user is generally substantially constant, or, at least, during said interval of time, the user moves much less in comparison to the apparatus and its display.

Estimating the display movement generally consumes less computational resources and battery power than estimating the user position with respect to the display. Therefore, estimating the initial user position and using this initial user position as a basis to control the display content during the interval of time after the first moment generally causes the apparatus to efficiently use its computational resources and/or battery power.

For instance, by knowing the relative position and orientation of the display and the user with respect to each other and by updating said relative position and orientation during the interval of time, a three-dimensional effect can be efficiently and precisely produced on the display. That is, if, for instance, the user rotates the apparatus (including the display) to the left with respect to an axis along his or her arm, the display content may be modified as if the objects displayed on the display had been also rotated leftwards. The invention thus provides an improved user interface control, since more information may be conferred through the use of a single display.

The first moment may be determined based on a condition being met. The condition may depend on the display content, wherein it is for instance determined that, in the display content, producing a three-dimensional effect or other visual effect would be beneficial for improving the user interface efficiency in conferring information. The condition may alternatively or also depend on the apparatus operation, wherein for instance the user position estimating unit is activated when a particular key is pressed on the apparatus, when the apparatus is switched on, or when a call is received by the apparatus, etc. Furthermore, the condition may alternatively or also depend on detecting that the user's face is in a particular position with respect to the apparatus. That is, the user position estimating unit may be used during a certain period of time, and, as soon as the user's face is determined in a particular position with respect to the apparatus, the moment wherein this determination takes place is determined to be the first moment.

The start and end of the interval of time after the first moment may also be determined based on conditions being met. Alternatively, the start and end of the interval of time may be predetermined based on a parameter stored in the portable apparatus.

In one embodiment, the apparatus is at least one of a mobile phone, an audio player, a camera including a display, a navigation device, an e-book device, a computer, a handheld computer, a personal digital assistant, a game console, and a handheld game console.

In one embodiment, the apparatus is configured for not estimating the user position during the interval of time after the first moment.

In one embodiment, the apparatus is further configured for estimating the user position, here referred to as new initial user position, at a second moment after the first moment. The apparatus is also configured in this embodiment for, during an interval of time after the second moment, estimating the display movement, and controlling the display content based on the display movement and the new initial user position.

This enables the user position to be newly estimated after the first moment, in order to obtain the relative position and orientation of the user and the display with respect to each other. In one embodiment, the user position is newly estimated regularly. That is, the embodiment implies regularly repeating the step of estimating the initial user position and thereafter the steps of estimating the display movement and controlling the display content based on the display movement and the initial user position. This enables to compensate for rendering errors that otherwise would be introduced if the user moved significantly or if the user head moved significantly. This also enables to compensate for a drift caused by measuring errors that may be introduced by the display movement estimating unit. In particular, if the control of the display content includes generating a three-dimensional visual effect on the display, regularly repeating the acquisition of the user position enables adapting the display content continuously without an escalating error drift.

In one embodiment, the time difference between the first moment and the second moment is comprised between one and ten seconds.

In one embodiment, the apparatus is further configured so that, during the interval of time after the second moment, the user position is not estimated.

In one embodiment, the apparatus is such that controlling the display content based on the initial user position and the display movement includes generating on the display a three-dimensional effect based on the initial user position and the display movement.

In a sub-embodiment of this embodiment, the apparatus is further configured, before estimating the initial user position, for determining whether a user is present in front of the display, and, if it is determined that no user is present, switching the apparatus to a non-three-dimensional mode wherein no three-dimensional effect is generated on the display. In this sub-embodiment, no three-dimensional effect is produced if it is determined that no user is present, so that the computational resources assigned to generate the three-dimensional effects are spared.

In one embodiment, the apparatus is further configured, before estimating the user position, for determining whether a plurality of users are present in front of the display, and, if so, selecting one of the users for the step of estimating the user position.

In one embodiment, the apparatus is such that the step of selecting one of the users is based on at least one of determining the user's face which is the closest to the display; determining the user's face which is the biggest as seen from the display; determining the user's face which is the closest to a perpendicular to the display; determining the user's face which is the closest to the centre of the field of view of a camera of the apparatus; and determining that the face of one of the users is recorded in the apparatus.

When selecting one of the users is based on determining that the face of one of the users is recorded in the apparatus, the user whose face has been recorded in the apparatus can efficiently be provided with display-based user interaction characteristics tailored to the direction where his or her face is positioned with respect to the display. Thus, such user may be offered advantageous user interaction capabilities to properly control the apparatus and receive information from the apparatus through the display.

In one embodiment, the apparatus further includes a camera, and the user position estimating unit is configured to use the camera output.

In one embodiment, the camera is configured for capturing images from the environment in front of a display. In one embodiment, the user position estimating unit is configured to use the output of more than one camera included in the apparatus.

In one embodiment, the above-mentioned camera is equipped with a multipoint autofocus and the user position estimating unit is configured to use the camera output by estimating that the shortest focus distance is the estimation of the user position.

In one embodiment, the apparatus is such that the user position estimating unit is configured for estimating the user position by estimating the position of the face of a user with respect to the display.

In one embodiment, the apparatus is such that the display movement estimating unit includes at least one of a gyroscope, one or more accelerometers, and an electronic compass. A three-axis accelerometer may for instance be used.

In one embodiment, the method is for controlling a portable electronic apparatus including a display. The method includes steps of estimating the position, here referred to as initial user position, of a user with respect to the display, at the first moment; and, during at least an interval of time after the first moment, estimating the movement of the display, here referred to as display movement, and controlling the display content based on the display movement and the initial user position.

The invention also relates to a computer program comprising instructions configured, when executed on a computer or on a portable electronic apparatus as described above, to cause the computer or the portable electronic apparatus respectively to carry out the method as described above. The invention also relates to any computer-readable medium storing such a computer program.

BRIEF DESCRIPTION OF THE DRAWINGS

Embodiments of the present invention shall now be described, in conjunction with the appended figures, in which.

DESCRIPTION OF SOME EMBODIMENTS

The present invention shall now be described in conjunction with specific embodiments. It may be noted that these specific embodiments serve to provide the skilled person with a better understanding, but are not intended to in any way restrict the scope of the invention, which is defined by the appended claims.

Figure 1:
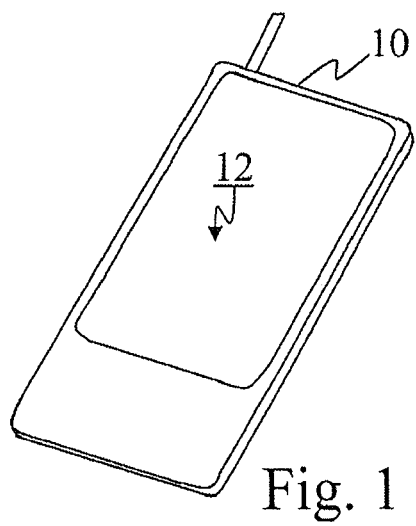
FIG. 1 schematically illustrates a portable electronic apparatus in one embodiment of the invention.

FIG. 1 schematically illustrates an apparatus 10 in one embodiment of the invention. The apparatus 10 includes a display 12. The display 12 may be any kind of display, such as a liquid crystal display (LCD) with or without touch-screen capabilities. The apparatus 10 may also include more than one display 12.

Although the apparatus 10 is illustrated in FIG. 1 with an antenna, the apparatus 10 need not be necessarily provided with wireless communication means. In one embodiment, the apparatus 10 is provided with wireless communication means. In another embodiment, the apparatus 10 is not provided with wireless communication means.

Figure 2A:
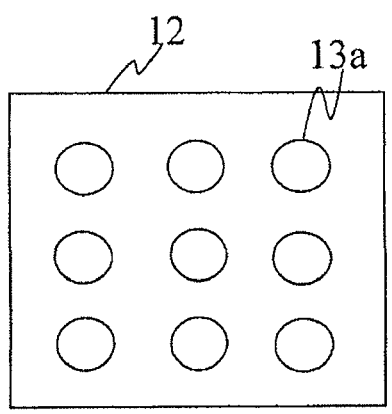
FIGS. 2a to 2c schematically illustrate the generation of a possible three-dimensional effect when the display of an apparatus in one embodiment of the invention is moved leftwards.
Figure 2B:
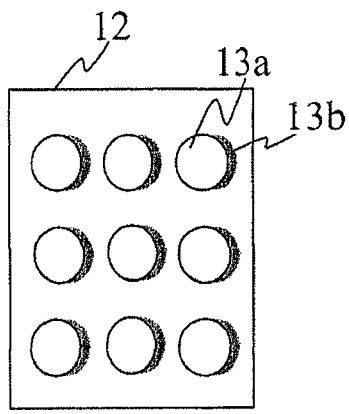
Figure 2C:
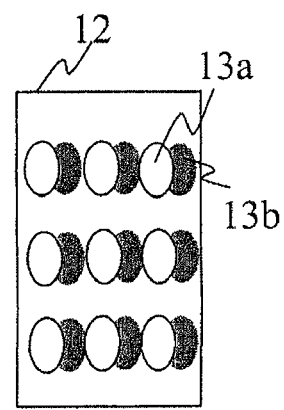

FIGS. 2a to 2c illustrate an exemplary three-dimensional effect that may be generated on a display 12 of an apparatus 10 in one embodiment of the invention. These FIGS. 2a to 2c partially correspond to FIGS. 3a to 3c of EP 1 667 471 A1. When the display 12 is tilted successively from FIGS. 2a to 2c, new icons 13b, representing the shadow of icons 13a start to appear. This gives an illusion of depth to the user.

The three-dimensional visual effects that may be produced on the display 12 are not limited to the appearance of shadows. In one embodiment (not illustrated), based on information to be displayed about a scene and based on known depth information associated with the different points of the scene to be displayed, three-dimensional effects are generated depending on the initial user position and the display movement, and possibly based on the estimated instantaneous relative position and orientation of the display 12 and user with respect to each other.

Controlling the display content based on the initial user position and the display movement is not limited to generate three-dimensional effects on the display 12. Other types of visual effects may be generated on the display 12.

Figure 3:
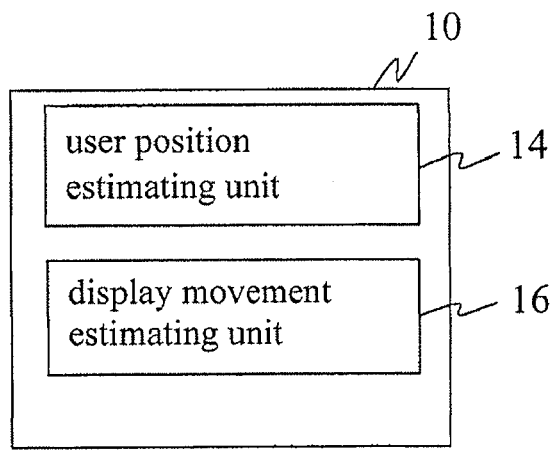
FIG. 3 schematically illustrates a portable electronic apparatus and some of its constituent units in one embodiment of the invention.

FIG. 3 schematically illustrates an apparatus 10 and some of its constituent elements in one embodiment of the invention.

In addition to including a display 12 (not illustrated in FIG. 3), the apparatus 10 includes a user position estimating unit 14 configured for estimating the user position with respect to the display 12. In particular, the user position estimating unit 14 may be configured for estimating the position of the face of a user with respect to the display 12. The apparatus 10 also includes a display movement estimating unit 16 configured for estimating the movement of the display 12. The apparatus 10 is configured for estimating the user position, referred to as initial user position, at the first moment. The apparatus 10 is also configured for, during an interval of time after the first moment, estimating the display movement and controlling the display content based on the initial user position estimated by the user position estimating unit 14 and the display movement estimated by the display movement estimating unit 16.

Although not shown in FIG. 3, a controlling unit may be provided in the apparatus 10 to control the display content based on the initial user position and the display movement. This control unit may be integrated within other controlling functions of the apparatus 10.

The use of the user position estimating unit 14 to obtain an estimation of the user position at a first moment, and then the use of the display movement estimating unit 16 to keep track of the movements of the apparatus 10 during the interval of time after the first moment, enables to track the relative position and orientation of the user and the display 12 with respect to each other. The tracking process in turn enables to control the display content in accordance with the instantaneous estimated relative position and orientation of the user and the display 12 with respect to each other. In addition, not permanently operating the user position estimating unit 14 contributes to sparing computational resources and battery power.

The combined use of the user position estimating unit 14 and the display movement estimating unit 16 enables to synergistically combine advantages of these two units. The display movement estimating unit 16, which may include a gyrometer, generally offers good spatial resolution, wide operating angle (360°), low computational resources utilization, low current consumption and resistance to environmental noise (varying lighting conditions etc.).

If the display movement estimating unit 16, which may include a gyrometer, was used alone, the user position relative to the display 12, i.e. the user interface "zero position" would have to be locked at some point in time. For instance, this could be done when the user's field of view is determined to be perpendicular to the display 12. Otherwise, the user interface would not accurately take into account the relative position and orientation between the user and the display 12 when the user moves the apparatus 10 and display thereof. Using the gyrometer alone would also generate the inability to detect the user's position relative to the display 12 so that a user movement while holding the apparatus 10 stationary would not be detected.

The characteristics of the user position estimating unit 14, which may include, or may use the output of, an image capturing unit such as a camera, and a unit for detecting a face on the captured image, generally offers a limited operating angle and generally requires significant computational resources (to continuously detect the user's face and determine the user's face position). It also consumes more battery power.

The combination of the user position estimating unit 14 and the display movement estimating unit 16 improves the precision and efficiency of using the estimated relative position of a user and the display 12 with respect to each other, in order to control the display content.

Figure 4A:
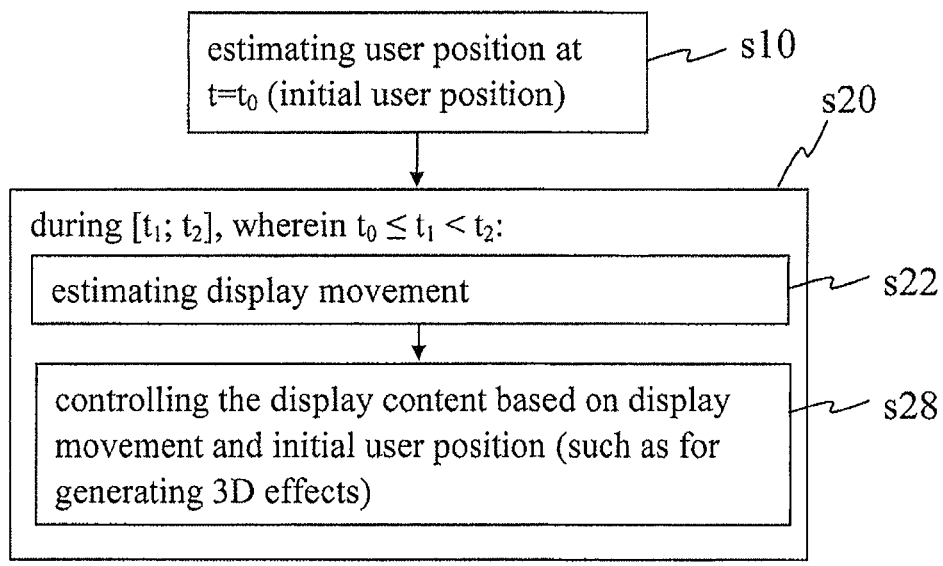
FIGS. 4a to 4c are flowcharts illustrating steps configured to be carried out by apparatuses in embodiments of the invention, such as by the apparatus illustrated in FIG. 3.

FIG. 4a is a flowchart, illustrating steps carried out in an apparatus 10 or method in one embodiment of the invention. First, in step s10, the user position is estimated at time $t=t_0$. This estimated user position constitutes the initial user position. Then, in step s20, during an interval of time between $t=t_1$ and $t=t_2$, wherein $t_0 \leq t_1 < t_2$, the display movement is estimated (step s22) and the display content is controlled (step s28) based on the initial user position estimated at time $t=t_0$ and the current estimated display movement.

Figure 4B:
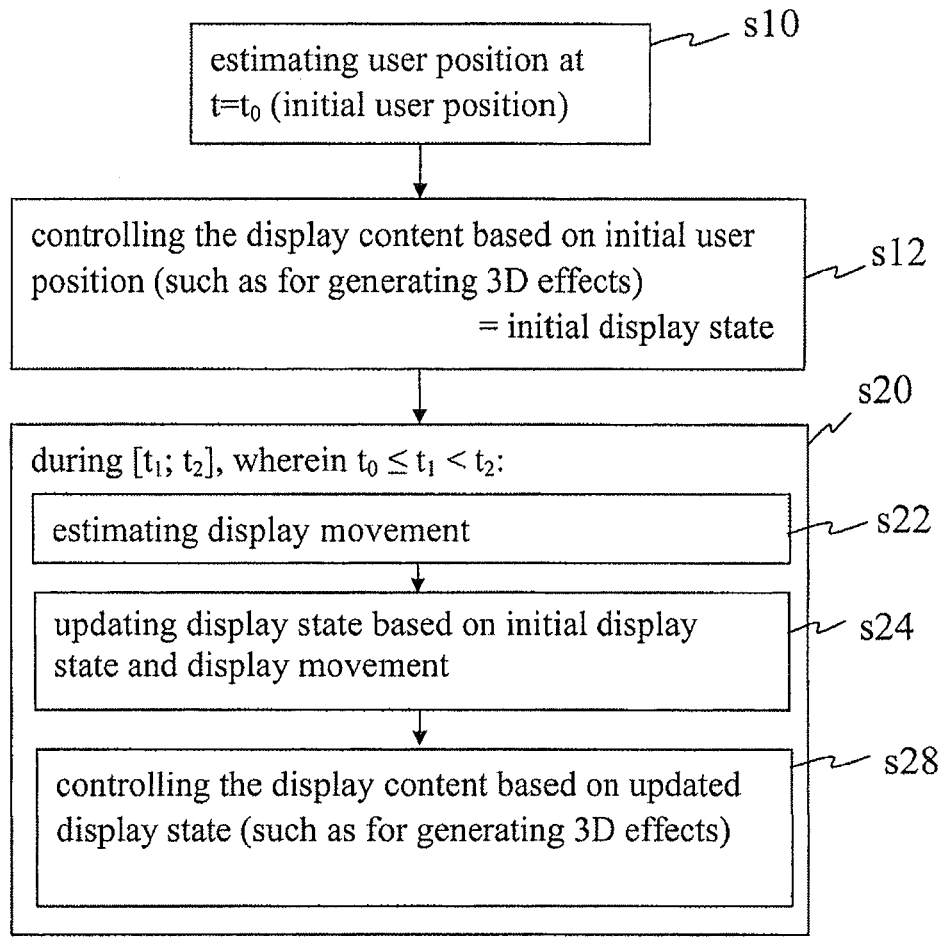

FIG. 4b is a flowchart illustrating steps carried out in an apparatus 10 or method in one embodiment of the invention. FIG. 4b is a first possible implementation of the steps illustrated in, and described with reference to, FIG. 4a. After estimating, in step s10, the user position at time $t=t_0$, to form the initial user position, the display content is controlled in step s12 based on the initial user position. The state of the display content at this stage is referred to as the initial display state.

Next, during the interval time between $t_1$ and $t_2$, wherein $t_0 \leq t_1 < t_2$, after estimating the display movement in step s22, the display state is updated based on the initial display state and the estimated display movement (step s24). The step s28 of controlling the display content based on the display movement and the initial user position is therefore implemented by a step of controlling the display content based on the updated display state. Since the updated display state is based on the initial display state and the display movement (see step s24) and since the initial display state is based on the initial user position (see step s12), it follows that the updated display state is based on the display movement and the initial user position, in line with step s28 illustrated in FIG. 4a.

Figure 4C:
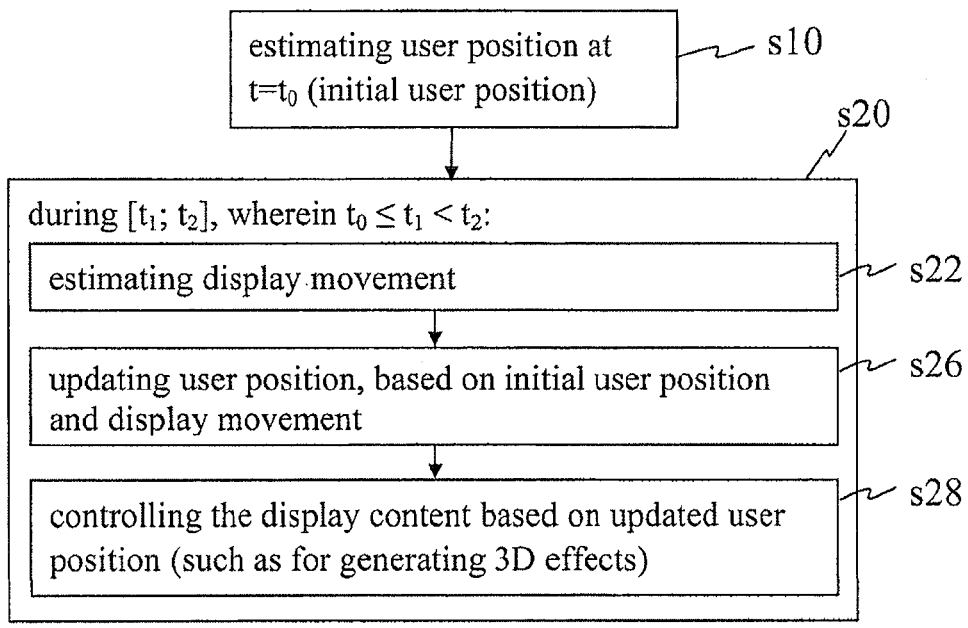

FIG. 4c is a flowchart illustrating steps carried out in an apparatus 10 or method in one embodiment of the invention. FIG. 4c illustrates another possible way of implementing the steps illustrated in, and described with reference to, FIG. 4a. After estimating the initial user position (step s10) and after estimating the display movement (step s22), a step s26 of updating the user position, based on the initial user position and the display movement is carried out. This involves starting with the initial user position and integrating during the interval of time between $t_1$ and $t_2$ the display movement to form an updated estimated user position estimating the current position of the user with respect to the display 12.

Afterwards, in step s28, the display content is controlled based on the updated user position. Since the updated user position is computed based on the initial user position and the display movement in step s26, step s28 in FIG. 4c constitutes one way of implementing step s28 as illustrated in FIG. 4a.

Figure 5:
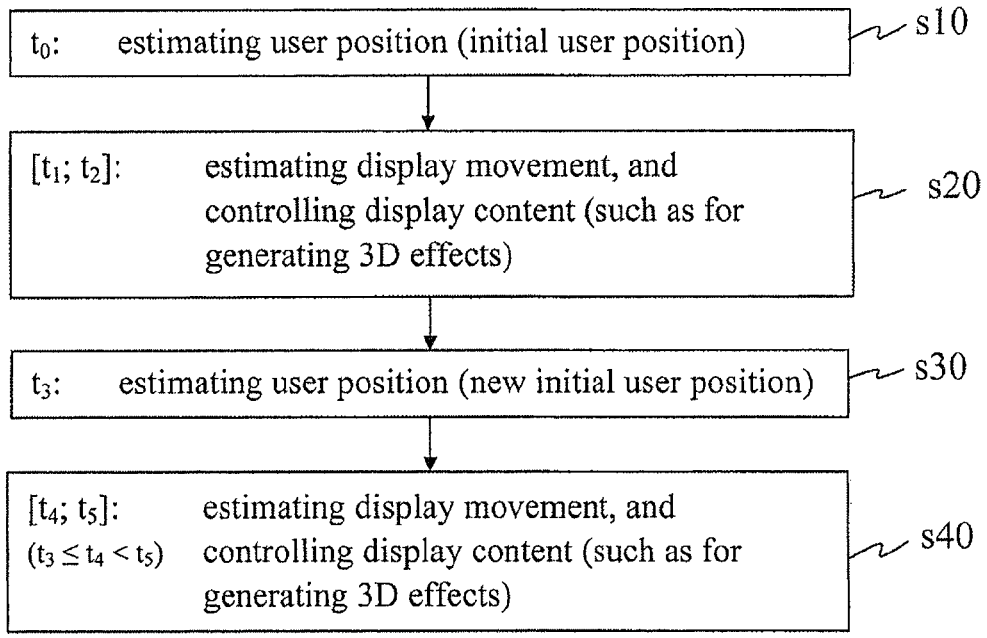
FIG. 5 is a flowchart illustrating steps configured to be carried out by an apparatus in one embodiment of the invention, wherein a new initial user position is estimated.

FIG. 5 is a flowchart illustrating steps carried out in an apparatus 10 or method in one embodiment of the invention. Compared to the embodiment described with reference to FIG. 4a, steps s30 and s40 are added in FIG. 5. After step s20, at time $t=t_3$, where $t_3 > t_0$, the user position is estimated (step s30). This step produces a new initial user position. Then, in step s40, during the interval of time from $t=t_4$ to $t=t_5$, wherein $t_3 \leq t_4 < t_5$, the display movement is estimated and the display content is controlled based on the new initial user position and the current estimated display movement.

The process of estimating a new initial user position may be regularly (i.e. at regular intervals) carried out to reset the user position to be used for controlling the display content.

The process of estimating a new initial user position may also be repeated without following a regular pattern in time. That is, when to recalibrate the process by estimating a new initial user position (using the user position estimating unit 14) may be determined based on a condition differing from the determination that a duration has lapsed, or at least not only based on such a determination. In one embodiment, a measure of the accuracy of the control carried out based on the display movement may be produced. If such an accuracy measure falls below a threshold, recalibration is started, thus ending the interval of time after the first moment and scheduling a new first moment, which may also be called second moment or calibration moment. In this case, the duration of the intervals of time during which control of the display content based on the display movement and the initial user position takes place may vary in operation.

Figure 6:
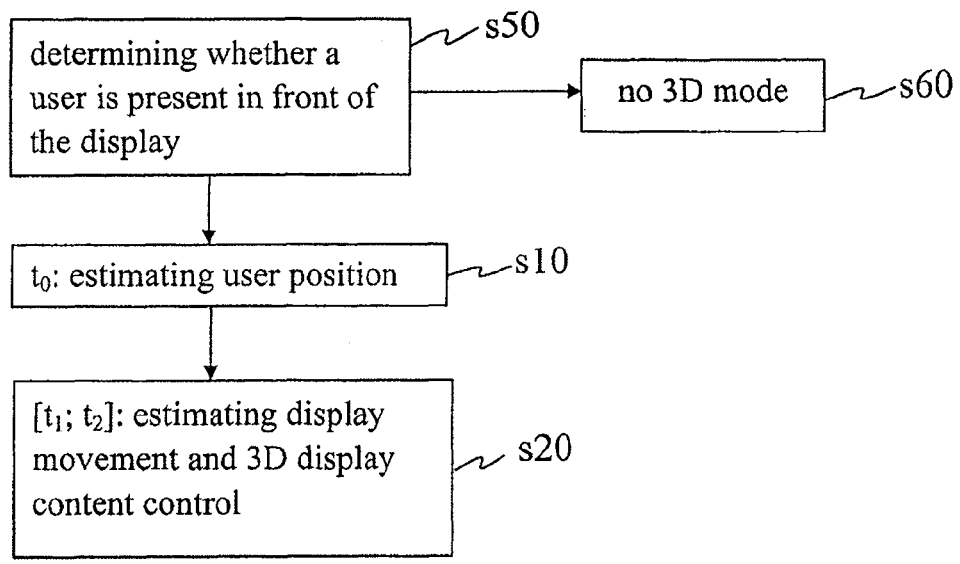
FIG. 6 is a flowchart illustrating steps configured to be carried out by an apparatus in one embodiment of the invention, including a step of determining whether a user is present in front of the display.

FIG. 6 is a flowchart illustrating steps carried out in an apparatus 10 or method in one embodiment of the invention. Before estimating the user position in step s10, as described notably with reference to FIG. 4a, a step s50 is performed. In step s50, whether a user is present in front of the display 12 is determined. If so, steps s10 and s20 are performed. Otherwise, i.e. if it is determined in step s50 that no user is present in front of the display 12, the display content of the apparatus 10 is not controlled based on the initial user position and the display movement.

In an embodiment wherein controlling the display content based on the initial user position and the display movement includes generating a three-dimensional effect based on the initial user position and the display movement, if it is determined that no user is present in front of the display 12 in step s50, the apparatus 10 enters in a non-three-dimensional mode, wherein no three-dimensional effects are added to the images to be displayed (step s60, "no 3D mode"). In other words, if no face is visible, the camera which may provide an input for the user position estimating unit 14 may be switched off, to save battery power, and a two-dimensional user interface may be operated, to save computational resources. The two-dimensional mode may correspond to a three-dimensional user interface rendered as if the user's field of view was constantly perpendicular to the display 12.

Figure 7:
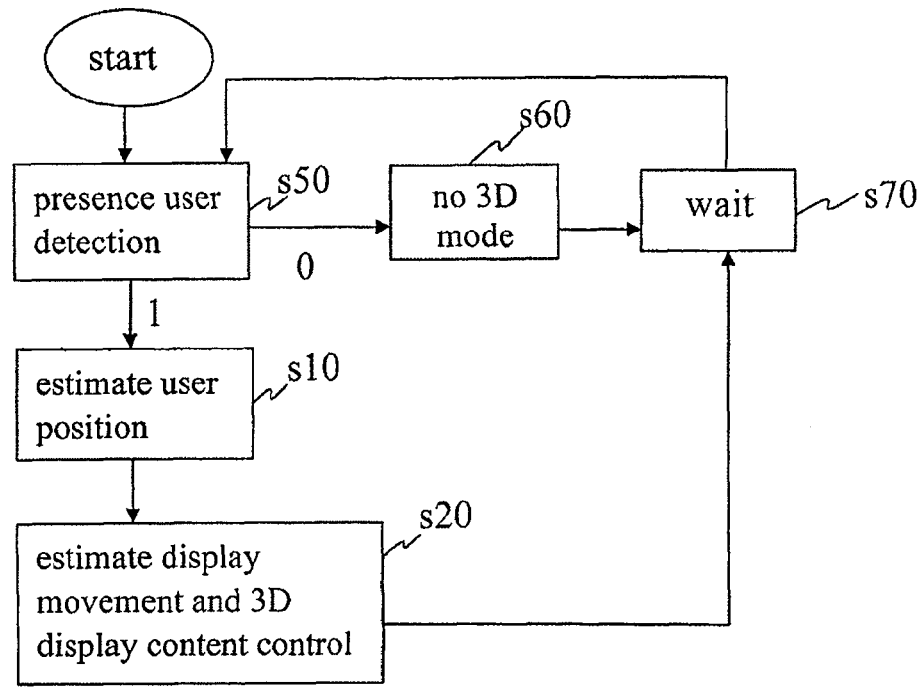
FIG. 7 schematically illustrates steps configured to be carried out in one embodiment of the invention, wherein regularly whether a user is present in front of the display is determined.

FIG. 7 is a flowchart illustrating steps carried out in an apparatus 10 or a method in one embodiment of the invention. First, after starting the process (box labelled "start"), it is detected (i.e. determined) in step s50 whether a user faces the display 12. Step s50 may involve switching on a camera of the apparatus 10 and using a face detection method based on one or more image obtained from the camera in order to determine whether a user's face is visible.

If a user's face is visible, the user's position is estimated in step s10. This may involve computing the position of the face using a face detection method. This may also involve directly afterwards switching off the camera which may not be needed (unless used for another purpose) at that stage. This saves battery power. Then, three-dimensional user interface effects may be generated in accordance with the computed face position. Afterwards, the three-dimensional effect generation may continue to be produced based on the estimated display movement (step s20). The display movement may be estimated using a gyrometer.

If however, no user is detected, i.e. if no face is visible or can be detected in the image or images captured by the camera in step s50, the camera may be switched off and a two-dimensional user interface mode may be used (step s60, "no 3D mode").

At regular intervals, it may be checked whether a face is visible on an image or images captured by the camera. This step of determining whether a face is visible in front of the camera at regular intervals is illustrated in FIG. 7 by both steps s70 and s50. However, it should be understood that step s70, labelled "wait", does not mean waiting an interval of time without doing anything. It means that, in parallel to the currently carried out steps s20 or s60, step s50 of detecting the presence of a user is carried out after a time interval has lapsed since the last execution of step s50.

The advantages of checking at regular intervals whether a face is visible are as follows. First, this enables to compensate for rendering errors that otherwise would be introduced if the user moves his head significantly. This also enables to compensate for a drift caused by measuring errors in the user position estimating unit 14, which may include a gyrometer. Additionally, if the apparatus 10 operates in a non-three-dimensional mode (step s60), checking at regular intervals whether a face is visible in front of the display 12 enables to determine whether the apparatus 10 can be switched from the non-three-dimensional mode to the three-dimensional mode wherein a three-dimensional effect can be generated.

As mentioned above, a face detection method may be used to determine whether a user's face is visible and, if so, to determine its position. Non-limiting examples of face detection methods include those disclosed in K. C. Yow and R. Cipolla, "*Enhancing Human Face Detection Using Motion and Active Contours*," Proc. Third Asian Conf. Computer Vision, pp. 515-522, 1998 (method based on facial features); A. Rajagopalan, K. Kumar, J. Karlekar, R. Manivasakan, M. Patil, U. Desai, P. Poonacha, and S. Chaudhuri, "*Finding Faces in Photographs*," Proc. Sixth IEEE Int'l Conf. Computer Vision, pp. 640-645, 1998 (method based on hidden Markov model); and E. Osuna, R. Freund, and F. Girosi, "*Training Support Vector Machines: An Application to Face Detection*," Proc. IEEE Conf. Computer Vision and Pattern Recognition, pp. 130-136, 1997 (method based on Support Vector Machines).

Figure 8:
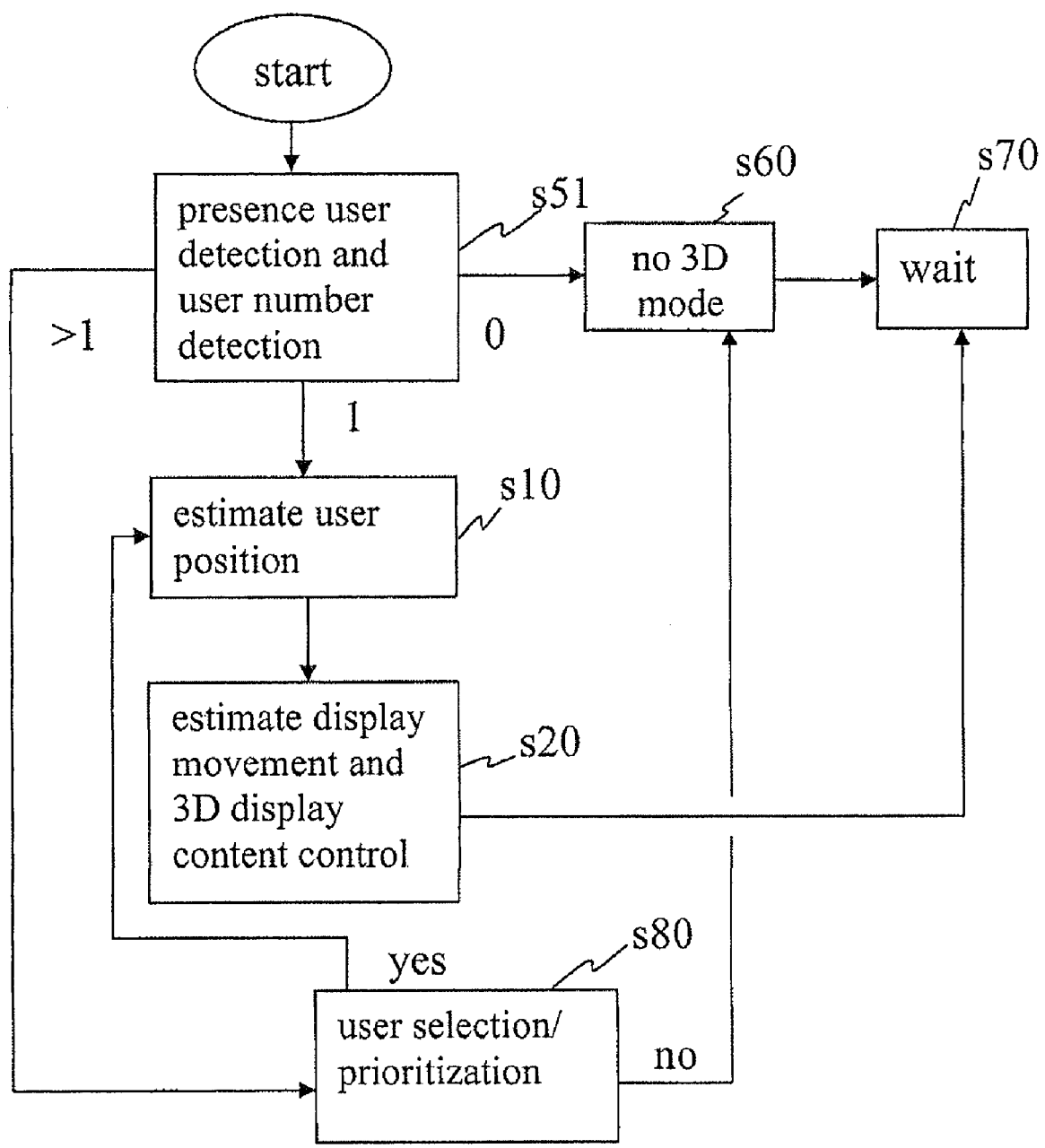
FIG. 8 is a flowchart illustrating steps configured to be carried out by an apparatus in one embodiment of the invention, including a user selection/prioritization step.

FIG. 8 is a flowchart illustrating steps carried out in an apparatus 10 or a method in one embodiment of the invention, which differ from the apparatus 10 and method described with reference to FIG. 7 in that a determination of whether more than one user is present in front of the display 12 is carried out. Namely, if, in step s51, more than one user is determined to be present in front of the display 12, a user selection step s80 is carried out.

Step s80 may be implemented as follows. If more than one face is detected, the apparatus 10 prioritizes which face should be used to control the rendering of the three-dimensional user interface using the camera and a face detection recognition method. The prioritization may be based for instance on the size of the face. Namely, the biggest face is the most likely to be the one closest to the apparatus 10 and therefore also belonging to the user actually using the apparatus 10. The prioritization may also be based on which user appears to be the closest to the centre of the camera's field of view, which is likely to be the user using the apparatus 10. A further manner to disambiguate between different users detected in the field of view may be to perform a face recognition process. Namely, the face of the owner of the apparatus 10 may be known and can be recognized. Another approach is also to register and prioritize guest users of the apparatus 10.

If one of the selected method or a combination of them fails, the apparatus operation is reverted to using a two-dimensional, non-three-dimensional mode, as described above (as illustrated by the arrow from step s80 to step s60). Otherwise, if one of the user's faces is successfully selected, the user position estimation process is carried out (as illustrated by the arrow from step s80 to step s10).

As mentioned above, a face recognition method may be used to disambiguate between different users detected in the field of view. Non-limiting examples of face recognition methods include those disclosed in M. Turk and A. Pentland, "*Eigenfaces for Recognition*," J. Cognitive Neuroscience, vol. 3, no. 1, pp. 71-86, 1991 (method based on Eigenfaces); P. Viola, M. J. Jones, "*Robust Real-Time Face Detection*", International Journal of Computer Vision, Vol. 57, No. 2, May 2004, pp. 137-154 (method based on Boosting); and K. Etemad, R. Chellappa, "*Discriminant Analysis for Recognition of Human Face Images*", Journal of the Optical Society of America A, Vol. 14, No. 8, August 1997, pp. 1724-1733 (method based on Linear Discriminant Analysis).

As mentioned above, in one embodiment, the user position estimating unit 14 is switched off or deactivated during the interval of time after the first moment. This reduces the computational resources and battery power used by the apparatus 10 to control the display content on the display 12. In other words, the use of the user position estimating unit 14, and the camera it may use, may be limited in a temporal manner.

With in mind the same aim of reducing the usage of computational resources and battery power within the apparatus 10, the use of the user position estimating unit 14, and the camera it may use, may alternatively be limited in a spatial or quality manner. This will now be explained in more details.

In one embodiment (not illustrated in the drawings), the apparatus 10 is configured for estimating s10, with the user position estimating unit 14, the user position at a first moment, and then, during the interval of time after the first moment, the apparatus 10 is further configured for estimating the user position, but with the user position estimating unit 14 then operating in a so-called spatially limited mode. In this spatially limited mode, the user position estimating unit 14 consumes less computational resources and/or less power resources. The user position estimating unit 14 operates in a spatially limited mode by capturing and processing pictures of a limited field of view centralized on the user's face. The limited field of view to use may be identified based on the position of the user's face as estimated at the first moment and as corrected by a motion vector computed based on the estimated display movement.

The spatially limited picture input may thus be processed to obtain information about the user position, which may be in turn used to control (step s28) the display content in combination with the display movement and the initial user position. This also achieves the technical effect of generating display effects efficiently based on the estimated positions of the display and user with respect to each other while reducing the computational resources and/or battery power required to do so, compared to a case wherein the user position estimating unit 14 would be used alone, permanently and fully activated (i.e. non spatially limited).

The above-explained optional use, during the interval of time after the first moment, of the display movement estimating unit 16 in combination with the user position estimating unit 14 operating in a spatial limited mode, which may reduce the use of computational resources and/or battery power compared using the user position estimating unit 14 alone, is combined in one embodiment with the following feature. Namely, if a face is not found within the picture captured in the spatially limited mode, the following fallback mechanism may be provided. If a face is not found in the predicted region (i.e. limited field of view), a full frame (i.e. full field of view) may be captured and analyzed, thus ending the interval of time after the first moment and constituting a new first moment within the meaning of the invention.

In a further embodiment (not illustrated in the drawings), the same technical effect is achieved by operating the user position estimating unit 14 during the interval of time after the first moment, but in a so-called qualitatively limited manner. That is, the user position estimating unit 14 is configured in this mode to capture a picture with a qualitatively lower resolution of the user's face, but which, in conjunction with the display movement and the initial estimated user position, may be used to control the display content (step s28).

As already mentioned, in one embodiment, the display movement estimating unit includes at least one of a gyroscope, one or more accelerometers, and an electronic compass.

A skilled person would be able to identify suitable accelerometers for use in this embodiment of the invention for instance (non-limiting examples) from section "Consumer Electronics" of "Accelerometer (2009, May 18), In *Wikipedia, The Free Encyclopedia*, Retrieved 13:32, May 18, 2009, from http://en.wikipedia.org/w/index.php?title= Accelerometer&oldid=290674932", especially as far as micro electromechanical systems (MEMS) type are concerned. Some exemplary accelerometers are also for instance manufactured by Analog Devices, Inc., Norwood, Mass., United States (see for instance brand "iMEMS Accelerometers"). Some exemplary gyroscopes are also manufactured for instance by Analog Devices (see for instance brand "iMEMS Gyroscopes").

A skilled person would be able to identify suitable electronic compasses for use in this embodiment of the invention for instance (non-limiting examples) from section "Solid state compasses" of "Compass (2009, May 17), In *Wikipedia, The Free Encyclopedia*, Retrieved 13:53, May 18, 2009, from http://en.wikipedia.org/w/index.php?title=Compass&oldid= 290609843". Some exemplary electronic compasses are also for instance manufactured by Honeywell Inc., Morristown, N.J., US, see for instance Honeywell HMR3100 model, a two-axis electronic compass used to derive heading output.

The physical entities according to the invention, including the apparatus 10 may comprise or store computer programs including instructions such that, when the computer programs are executed on the physical entities, steps and procedures according to embodiments of the invention are carried out. The invention also relates to such computer programs for carrying out methods according to the invention, and to any computer-readable medium storing the computer programs for carrying out methods according to the invention.

Where the terms "user position estimating unit", "display movement estimating unit", and "controlling unit" are used herewith, no restriction is made regarding how distributed these units may be and regarding how gathered units may be. That is, the constituent elements of the above user position estimating unit, display movement estimating unit and controlling unit may be distributed in different software or hardware components or devices for bringing about the intended function. A plurality of distinct elements may also be gathered for providing the intended functionalities.

Any one of the above-referred units of an apparatus 10 may be implemented in hardware, software, field-programmable gate array (FPGA), application-specific integrated circuit (ASICs), firmware or the like.

In further embodiments of the invention, any one of the above-mentioned and/or claimed user position estimating unit, display movement estimating unit and controlling unit is replaced by user position estimating means, display movement estimating means and controlling means respectively, or by user position estimator, display movement estimator and controller respectively, for performing the functions of the user position estimating unit, display movement estimating unit and controlling unit.

In further embodiments of the invention, any one of the above-described steps may be implemented using computer-readable instructions, for instance in the form of computer-understandable procedures, methods or the like, in any kind of computer languages, and/or in the form of embedded software on firmware, integrated circuits or the like.

Although the present invention has been described on the basis of detailed examples, the detailed examples only serve to provide the skilled person with a better understanding, and are not intended to limit the scope of the invention. The scope of the invention is much rather defined by the appended claims.

The invention claimed is:

1. Portable electronic apparatus including
a display configured to display content;
a user position estimating unit for estimating a position of a user with respect to the display; and
a display movement estimating unit for estimating movement of the display; and
wherein the apparatus is configured for
estimating, with the user position estimating unit, an initial position of the user, at a first moment;
during an interval of time after the first moment, estimating, with the display movement estimating unit, the display movement, and controlling the display content based on the display movement and the initial position of the user,
the apparatus being further configured, before estimating the position of the user, for
determining whether a user is present in front of the display, and,
wherein controlling the display content based on the display movement and the initial position of the user includes generating, if it is determined that a user is present in front of the display, on the display a three-dimensional effect based on the display movement and the initial position of the user, and
if it is determined that no user is present, operating the apparatus in a non-three-dimensional effect mode wherein no three-dimensional effect is generated on the display.

2. Apparatus according to claim 1, further including a camera having a camera output, wherein the user position estimating unit is configured to use the camera output.

3. Apparatus of claim 2, wherein the camera is equipped with a multi-point autofocus, and the user position estimating unit is configured to use the camera output by determining that a shortest focus distance determined by the autofocus is the estimation of the position of the user.

4. Apparatus of claim 2, wherein the user position estimating unit is configured for estimating the position of the user by estimating a position of a face of the user with respect to the display.

5. Apparatus according to claim 1, wherein the display movement estimating unit includes at least one of a gyroscope, one or more accelerometers, or electronic compass.

6. Apparatus according to claim 1, further configured for regularly repeating the step of estimating the initial position of the user and thereafter the steps of estimating the display movement and controlling the display content based on the display movement and the initial position of the user.

7. Portable electronic apparatus including
a display configured to display content;
a user position estimating unit for estimating a position of a user with respect to the display; and
a display movement estimating unit for estimating movement of the display; and
wherein the apparatus is configured for
estimating, with the user position estimating unit, an initial position of the user, at a first moment;
during an interval of time after the first moment, estimating, with the display movement estimating unit, the display movement, and controlling the display content based on the display movement and the initial position of the user,
the apparatus being further configured for
determining, before estimating the position of the user, whether a plurality of users are present in front of the display, and,
if it is determined that a plurality of users are present in front of the display, selecting one of the users for the step of estimating the position of the user,
wherein selecting one of the users is based on at least one of
determining a user's face which is the closest to the display;
determining a user's face which is the biggest as seen from the display;
determining a user's face which is the closest to a perpendicular originating from the center of the display;
determining a user's face which is the closest to the center of the field of view of a camera of the apparatus; or
determining that a face of one of the users is recorded in the apparatus.

8. Method for controlling a portable electronic apparatus including a display configured to display content, the method including steps of
at a first moment,
estimating an initial position of a user with respect to the display;
during an interval of time after the first moment,
estimating movement of the display, and
controlling the display content based on the display movement and the initial position of the user,
wherein controlling the display content based on the display movement and the initial position of the user includes generating on the display a three-dimensional effect based on the display movement and the initial position of the user, and
further including, before estimating the initial position of the user, steps of
determining whether a user is present in front of the display, and,
if it is determined that no user is present, switching the apparatus to a non-three-dimensional effect mode wherein no three-dimensional effect is generated on the display.

9. Method according to claim 8, further including,
before estimating the initial position of the user, steps of
determining whether a plurality of users are present in front of the display, and,
if a plurality of users are present in front of the display, selecting one of the users for the step of estimating the initial position of the user.

10. Method according to claim 8, wherein estimating the initial position of the user makes use of a camera.

11. Method of claim 10, wherein the camera has an output, and wherein estimating the initial position of the user makes use of the output of the camera by determining shortest focus distance as the estimation of the initial position of the user.

12. Method of claim 10, wherein the camera has an output, and wherein estimating the initial position of the user makes use of the output of the camera by estimating a position of a face of the user with respect to the display.

13. Method according to claim 8, wherein estimating the display movement makes use of at least one of a gyroscope, one or more accelerometers, or electronic compass.

14. Method according to claim 8, including regularly repeating the step of estimating the initial position of the user and thereafter the steps of estimating the display movement and controlling the display content based on the display movement and the initial position of the user.

15. Method for controlling a portable electronic apparatus including a display configured to display content, the method including steps of
at a first moment,
estimating an initial position of a user with respect to the display;
during an interval of time after the first moment,
estimating the movement of the display, and
controlling the display content based on the display movement and the initial position of the user,
further including, before estimating the initial position of the user, steps of
determining whether a plurality of users are present in front of the display, and,
if a plurality of users are present in front of the display, selecting one of the users for the step of estimating the initial position of the user, and
wherein selecting one of the users is based on at least one of
determining a user's face which is the closest to the display;
determining a user's face which is the biggest as seen from the display;
determining a user's face which is the closest to a perpendicular originating from the center of the display;
determining a user's face which is the closest to the center of the field of view of a camera of the apparatus; or
determining that the face of one of the users is recorded in the apparatus.

16. A non-transitory computer readable storage medium storing a computer program comprising instructions configured, when executed on a computer, to cause the computer to carry out the method according to claim 8.

* * * * *